(12) United States Patent
Paulin

(10) Patent No.: US 8,025,442 B2
(45) Date of Patent: Sep. 27, 2011

(54) APPARATUS AND METHOD FOR PRESENTING INFORMATION ON TRANSPARENT RESEALABLE STORAGE BAGS

(76) Inventor: Kathy Wood Paulin, La Jolla, CA (US)

( * ) Notice: Subject to any disclaimer, the term of this patent is extended or adjusted under 35 U.S.C. 154(b) by 1279 days.

(21) Appl. No.: 11/272,225

(22) Filed: Nov. 10, 2005

(65) Prior Publication Data

US 2007/0104396 A1    May 10, 2007

(51) Int. Cl.
*B65D 33/04* (2006.01)
*B65D 33/00* (2006.01)
(52) U.S. Cl. ........................ 383/106; 383/105
(58) Field of Classification Search .................. 383/106, 383/105, 127; 434/428, 429, 430; 206/459.5
See application file for complete search history.

(56) References Cited

U.S. PATENT DOCUMENTS

| | | | | |
|---|---|---|---|---|
| 1,745,946 A | * | 2/1930 | Murray | 273/296 |
| 3,074,451 A | * | 1/1963 | Whitney | 206/459.1 |
| 4,401,213 A | * | 8/1983 | Lerner | 206/205 |
| 5,358,407 A | * | 10/1994 | Lainer | 434/94 |
| 5,368,485 A | * | 11/1994 | Phillips | 434/75 |
| 5,554,093 A | * | 9/1996 | Porchia et al. | 493/240 |
| 5,618,111 A | * | 4/1997 | Porchia et al. | 383/63 |
| 5,790,718 A | * | 8/1998 | Tenner et al. | 383/127 |
| 6,786,638 B1 | * | 9/2004 | Bonds et al. | 374/162 |
| 7,370,689 B2 | * | 5/2008 | Wang | 165/11.1 |
| 2004/0066986 A1 | * | 4/2004 | Erlick et al. | 383/64 |
| 2005/0061707 A1 | * | 3/2005 | Naelitz-Thomas | 383/105 |
| 2006/0027478 A1 | * | 2/2006 | Kaufman et al. | 383/106 |

FOREIGN PATENT DOCUMENTS

| | | | | |
|---|---|---|---|---|
| JP | 05319473 A | * | 12/1993 | |
| JP | 2001010298 A | * | 1/2001 | |

* cited by examiner

*Primary Examiner* — Jes F Pascua
(74) *Attorney, Agent, or Firm* — Diederiks & Whitelaw, PLC

(57) ABSTRACT

An apparatus and method for presenting information on transparent resealable storage bags. Embodiments allow for the presentation of graphic images such as numbers, letters, cartoon characters (such as Disney® characters, e.g., Mickey Mouse®), colors, animals, dinosaurs, flowers, trains, cars, planes, hearts, marketing logos, puzzles (including puzzles that are complete when the sides of the bag are next to one another and incomplete when the sides of the bag are separated) or any other information such as instructional information such as questions and answers or information that changes color based on temperature.

6 Claims, 11 Drawing Sheets

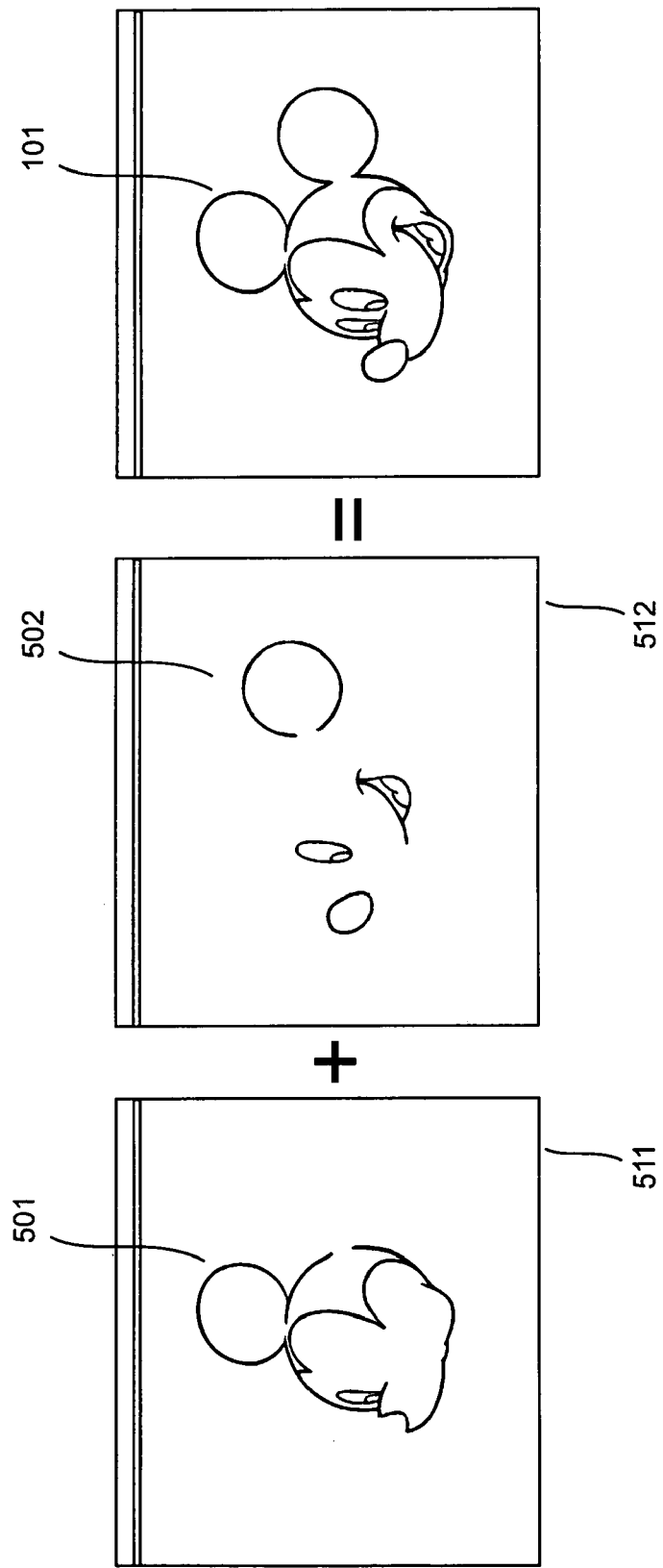

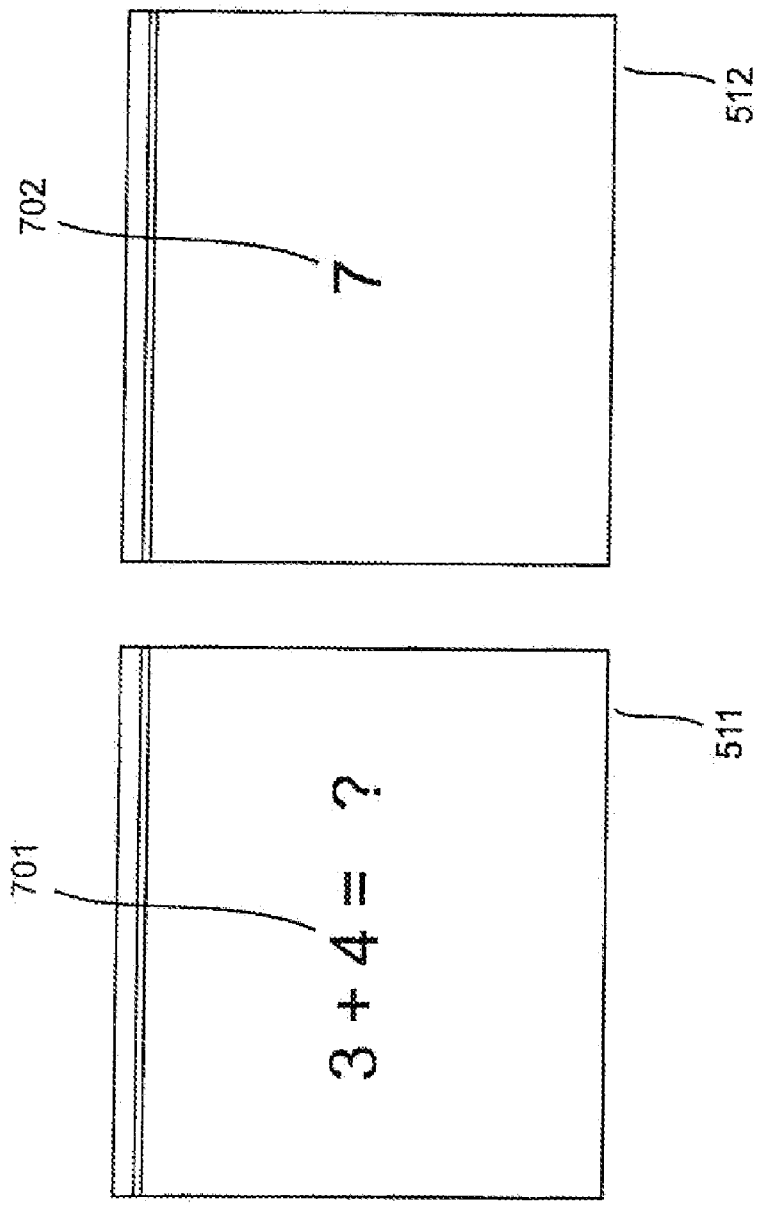

APPARATUS AND METHOD FOR PRESENTING INFORMATION ON TRANSPARENT RESEALABLE STORAGE BAGS

BACKGROUND OF THE INVENTION

1. Field of the Invention

Embodiments of the invention described herein pertain to the field of resealable storage bags. More particularly, but not by way of limitation, one or more embodiments of the invention enable presenting information on transparent resealable storage bags.

2. Description of the Related Art

There are no known apparatus that allow for presenting information on transparent resealable storage bags. An example of a resealable storage bag is a Ziploc® bag that was developed by Dow Chemical Company and originally test marketed in 1968. Heretofore, storage bags have been utilized for the sole purpose of storing items. Doing otherwise is unobvious since the original purpose of a storage bag is to store items. The general operation of known resealable storage bags begins with opening the bag, inserting items and resealing the bag. In order to retrieve items from the bag, the seal is opened and the items are retrieved. The bag may then be reused or discarded. There are no known resealable storage bags that allow for the presentation of graphic images such as numbers, letters, cartoon characters (such as Disney® characters, e.g., Mickey Mouse®), colors, animals, dinosaurs, flowers, trains, cars, planes, hearts, marketing logos, puzzles (including puzzles that are complete when the sides of the bag are next to one another and incomplete when the sides of the bag are separated) or any other information such as instructional information or information that changes color based on temperature.

U.S. Pat. No. 3,122,807 to Ausnit, patented on Mar. 3, 1964, entitled "Slider for a Pouch and the Like" is an example of an apparatus that stores items with a resealable slide fastener. See FIG. 1. This is an example of an apparatus that may be utilized to store items in a resealable bag, and for which the presenting of information is not contemplated.

U.S. Pat. No. 6,745,395 to Noble, patented on Jun. 8, 2004, entitled "Hat with Display Device" is an example of an apparatus that presents graphics images but which is unable to store items and seal them inside.

U.S. Pat. No. 6,045,281 to Bunn, et al., patented on Apr. 4, 2000, entitled "Writing Implement Attachment" is an example of an apparatus that presents indicia on front and back surfaces of a surface that is attached to a writing implement. The apparatus is intended to deter theft of the writing implement, however the device is unable to store items and seal them inside. See FIG. 3 for example.

U.S. Pat. No. 6,924,411 to Reider, patented on Aug. 2, 2005, entitled "Printable Bandage" is an example of an apparatus that enables the printing of graphics on a bandage. The apparatus is intended to help kids overcome fear and discomfort associated with an injury using decorated bandages, see for example FIG. 1, element 26 on bandage 24. The apparatus is unable to sealable store items within it.

None of the related art devices allow for presenting information on transparent resealable storage bags and for at least the limitations described above there is a need for an apparatus and method for presenting information on transparent resealable storage bags.

BRIEF SUMMARY OF THE INVENTION

One or more embodiments of the invention enable presenting information on transparent resealable storage bags. Embodiments of the invention allow for the presentation of graphic images such as numbers, letters, cartoon characters (such as Disney® characters, e.g., Mickey Mouse®), colors, animals, dinosaurs, flowers, trains, cars, planes, hearts, marketing logos, puzzles (including puzzles that are complete when the sides of the bag are next to one another and incomplete when the sides of the bag are separated) or any other information such as instructional information or information that changes color based on temperature.

In one embodiment of the invention intended for instructional purposes, numbers, letters, colors (for example with their names), questions and answers and puzzles are coupled with a resealable storage bag. This allows for the presentation of information on a sealable storage bag where no possibility for this type of information presentation has existed before the invention.

The presentation of information may be performed using one side of the sealable storage bag, may comprise separate images on each side of the sealable storage bag, or may comprise graphical images printed on both sides of the sealable storage bag that are oriented for viewing from one or both sides of the bag. In addition, the information on each side of the sealable storage bag may comprise elements that form an integrated graphic image when the two sides of the storage bag are situated next to each other wherein the information is not readily recognizable when the two sides of the bag are separated thereby forming a puzzle.

The information presented on one side of the bag may comprise an image that has a meaning that is different on one side of the bag than on the other. For example, a Mickey Mouse® on one side may be viewed as a water molecule on the other side of the bag.

The graphics on each side of the bag are not required to comprise the same shape, for example in the case of a question on one side of the bag and an answer on the other side of the bag. For example, a question may be stated on one side of a bag such as "3+4=?", while on the other side of the bag, the answer "7" may be presented so that it is only visible from the second side of the bag, e.g., so that the answer is not visible to the viewer of the first side of the bag. The graphical images may comprise marketing logos, either subtly integrated into an image or comprising a prominently positioned logo.

Polymers comprising temperature dependent color compounds may be coupled with embodiments of the invention to allow for the presentation of information in color that changes based on temperature. This functionality allows for a thermometer graphic for example to show a user the temperature of the bag. Other indicium that represents the temperature for a given color may be presented in colors that are independent of temperature for example to provide a scale to use in judging the temperature dependent color for example.

Methods of presenting information utilizing the apparatus first start with printing or coupling graphical images to one or both sides of the sealable storage bag, (either the inside or outside of each side). The sealable storage bags are then generally packaged for sale. The information on the bags is then presented to a viewer of the bag by the entity that has printed or coupled an image to the bag. Advantages of embodiments of the invention include making learning fun for kids, branding of logos (either subtly or explicitly), and turning a device that is normally devoid of information into a presentation apparatus that allows for the presentation of information in a setting where no possibility has ever existed.

BRIEF DESCRIPTION OF THE DRAWINGS

The above and other aspects, features and advantages of the invention will be more apparent from the following more particular description thereof, presented in conjunction with the following drawings wherein:

FIG. 5 is a front view of an embodiment of the invention comprising a portion of a graphical image on a first side of the apparatus and a second portion of a graphical image on the opposing second side of the apparatus both of which form a composite graphical image when both sides of the apparatus are situated together.

FIG. 7A is a front view of an embodiment of the invention comprising a graphical image comprising a question.

FIG. 7B is a back view of the embodiment of FIG. 7A comprising a graphical image in the form of an answer to the question shown in FIG. 7A.

DETAILED DESCRIPTION

An apparatus and method for presenting information on transparent resealable storage bags is described herein. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention enable presenting information on transparent resealable storage bags. Embodiments of the invention allow for the presentation of graphic images such as numbers, letters, cartoon characters (such as Disney® characters, e.g., Mickey Mouse®), colors, animals, dinosaurs, flowers, trains, cars, planes, hearts, marketing logos, puzzles (including puzzles that are complete when the sides of the bag are next to one another and incomplete when the sides of the bag are separated) or any other information such as instructional information or information that changes color based on temperature.

Figure 1:
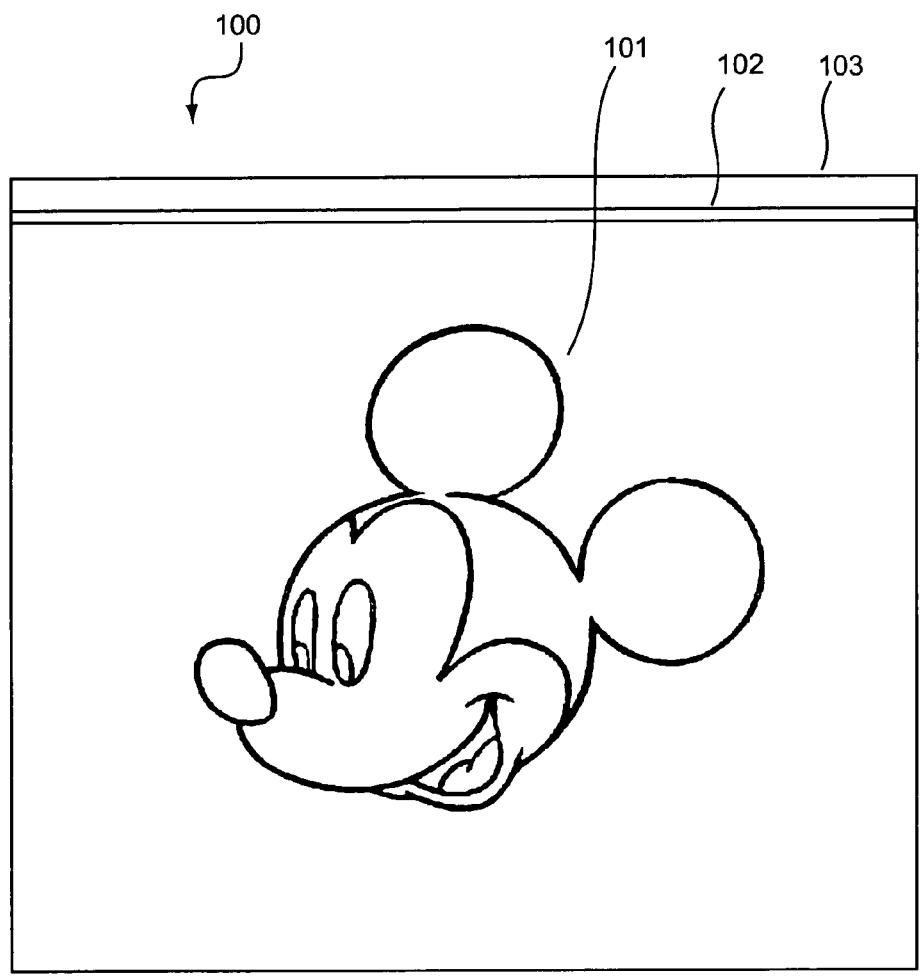
FIG. 1 is a front view of an embodiment of the invention comprising a graphical image.

FIG. 1 is a front view of an embodiment of the invention comprising a graphical image. The presentation of information may be performed using one side of the sealable storage bag as shown in FIG. 1. Although shown as cartoon character 101, one or more numbers, letters, animals, dinosaurs, flowers, trains, cars, planes, hearts, logos, puzzles, questions and answers may be utilized for information presentation purposes.

Figure 2:
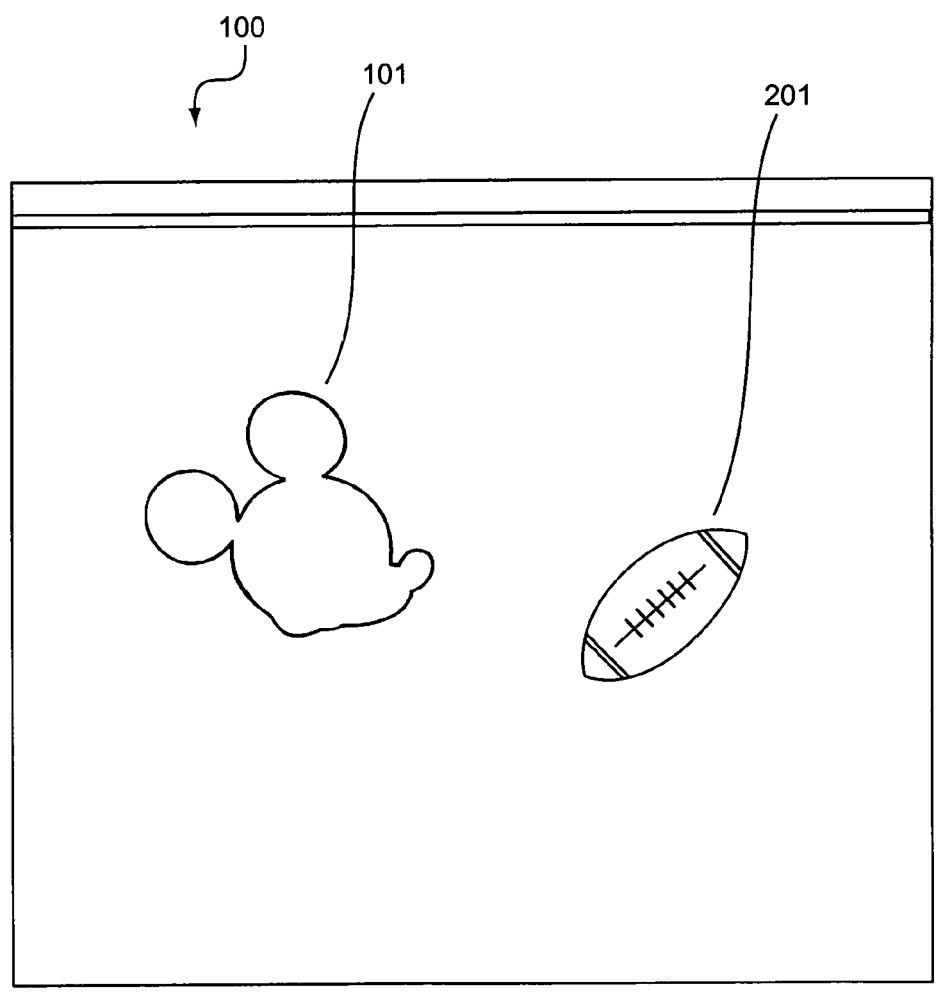
FIG. 2 is a front view of an embodiment of the invention comprising a graphical image on a first side of the apparatus and the outline of a second graphical image on the opposing second side of the apparatus.

FIG. 2 is a front view of an embodiment of the invention comprising graphical image 201 on a first side of the apparatus and the outline of a second graphical image 101 on the opposing second side of the apparatus. In one or more embodiments, the presentation of information is with respect to the side oriented for viewing. In this embodiment, graphical image 101 may only be distinguishable by outline for example.

Figure 3:
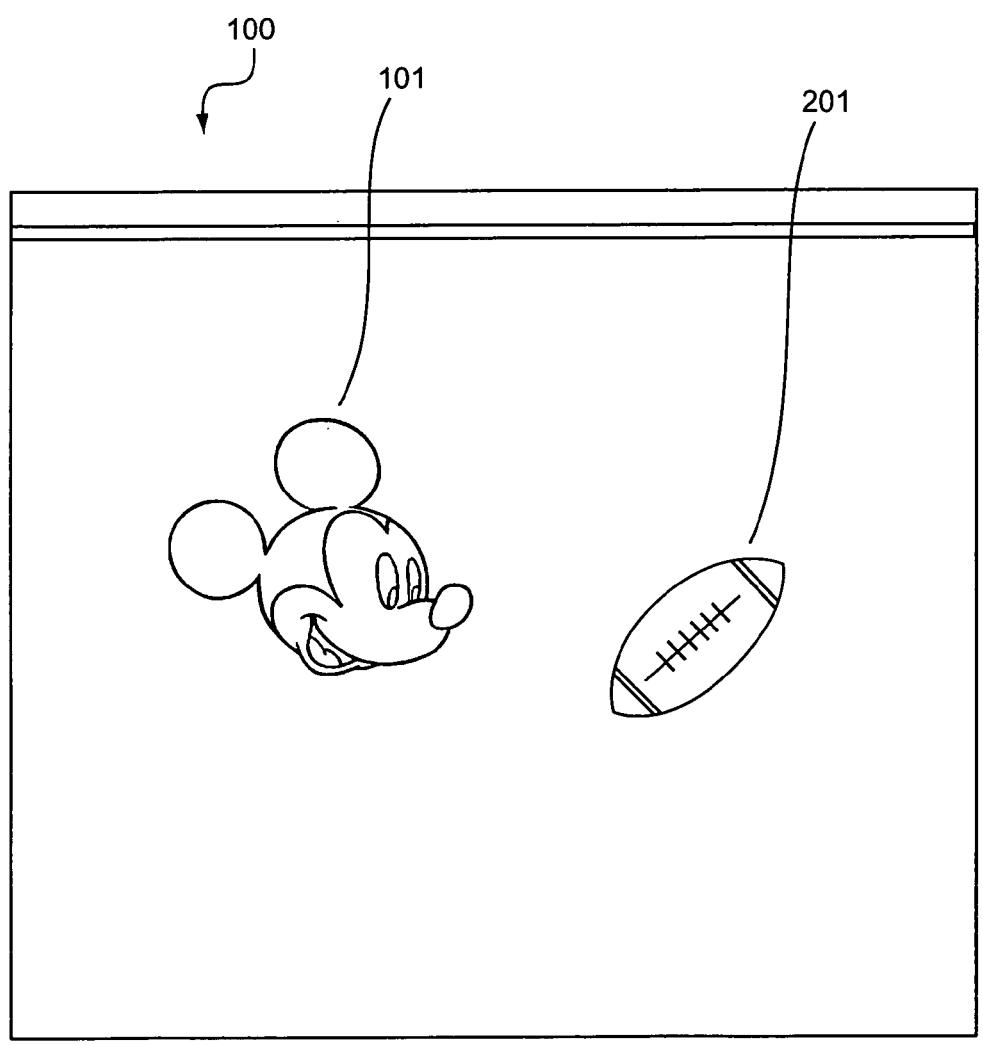
FIG. 3 is a front view of an embodiment of the invention comprising a graphical image on a first side of the apparatus and a second graphical image on the opposing second side of the apparatus both of which are viewable from the first side.

FIG. 3 is a front view of an embodiment of the invention comprising a graphical image on a first side of the apparatus and a second graphical image on the opposing second side of the apparatus both of which are viewable from the first side. In this embodiment, both graphical images 101 and 201 are viewable (e.g., with proper colors, etc.) from a first side. This is in opposition to the embodiment shown in FIG. 2, wherein only the outline of 101 was visible from a first side. Graphical images 101 and 201 in this embodiment are viewable from the first side, but appear as outlines from the second side.

Figure 4:
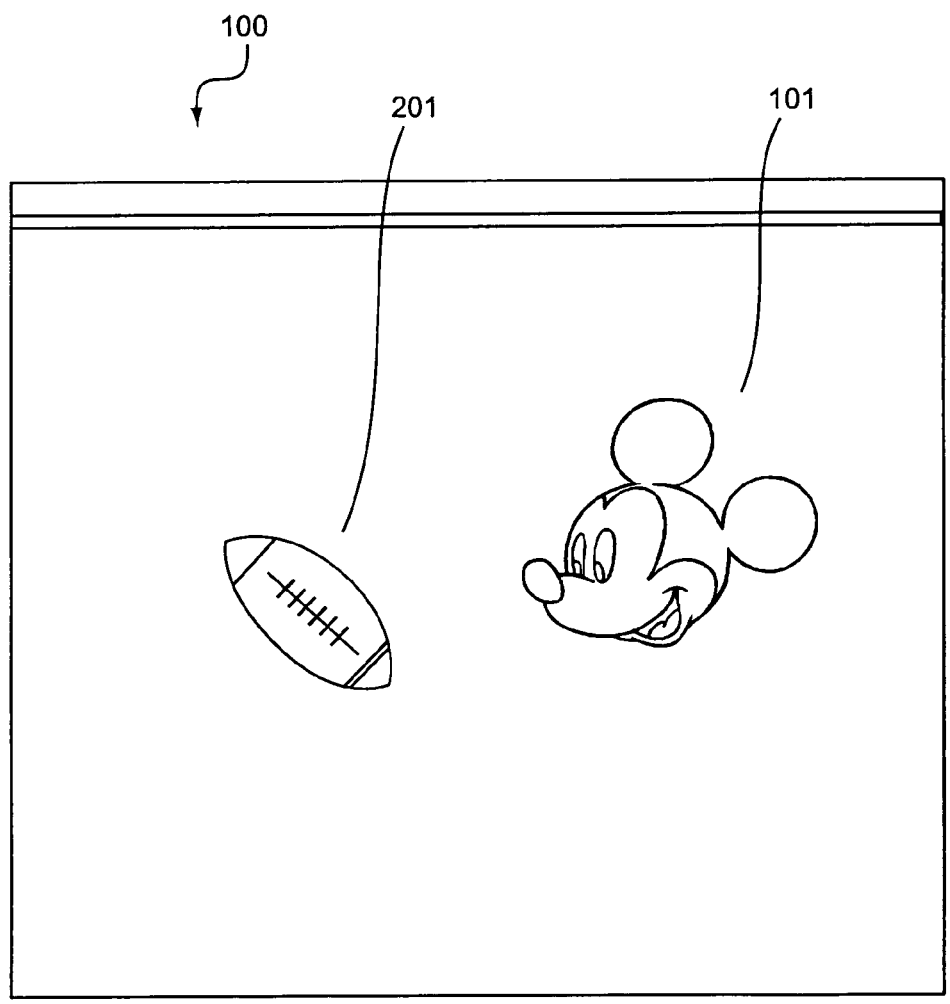
FIG. 4 is a rear view of an embodiment of the invention comprising a graphical image on a first side of the apparatus and a second graphical image on the opposing second side of the apparatus both of which are viewable from the second (rear) side.

FIG. 4 is a rear view of an embodiment of the invention comprising a graphical image on a first side of the apparatus and a second graphical image on the opposing second side of the apparatus both of which are viewable from the second (rear) side. In this embodiment, both graphical image 101 and 201 are visible from both sides of the bag. This is in opposition to the embodiment shown in FIG. 3.

FIG. 5 is a front view of an embodiment of the invention comprising a portion of a graphical image on a first side 511 of the apparatus and a second portion of a graphical image on the opposing second side 512 of the apparatus both of which form a composite graphical image when both sides of the apparatus are situated together. In this embodiment, graphical image 501 and graphical image 502 comprise portions of graphical image 101. The information on each side of the sealable storage bag may comprise elements that form an integrated graphic image when the two sides of the storage bag are situated next to each other wherein the information is not readily recognizable when the two sides of the bag are separated thereby forming a puzzle. When items are in the sealable storage bag including a seal 102 and a resealable opening 103 as shown in FIG. 1, for example a sandwich, a child may guess what the graphical images on one side of the bag form when the sandwich is removed and the second side of the bag is situated next to the first. Complex cutouts may be utilized to make the puzzle increasingly difficult to decipher while having only one side of the bag in view.

Figure 6A:
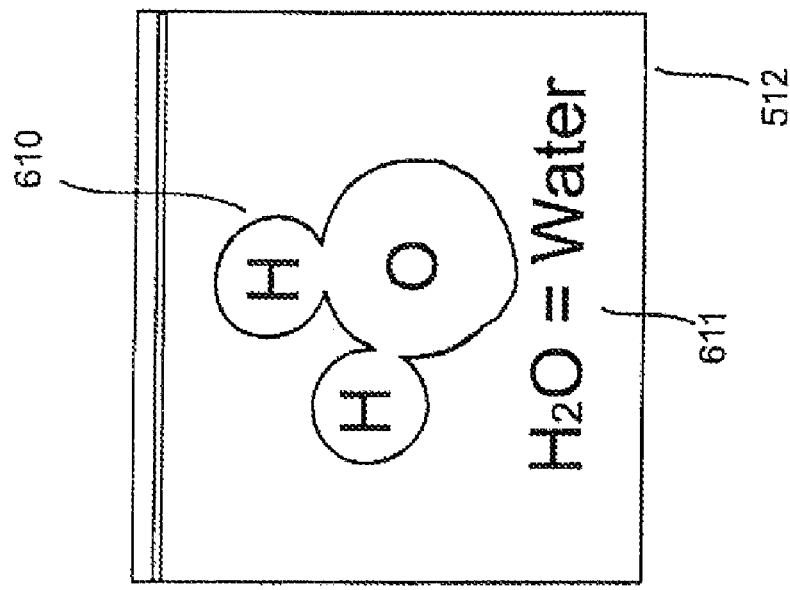
FIG. 6A is a front view of an embodiment of the invention comprising a graphical image on a first side of the apparatus.
Figure 6B:
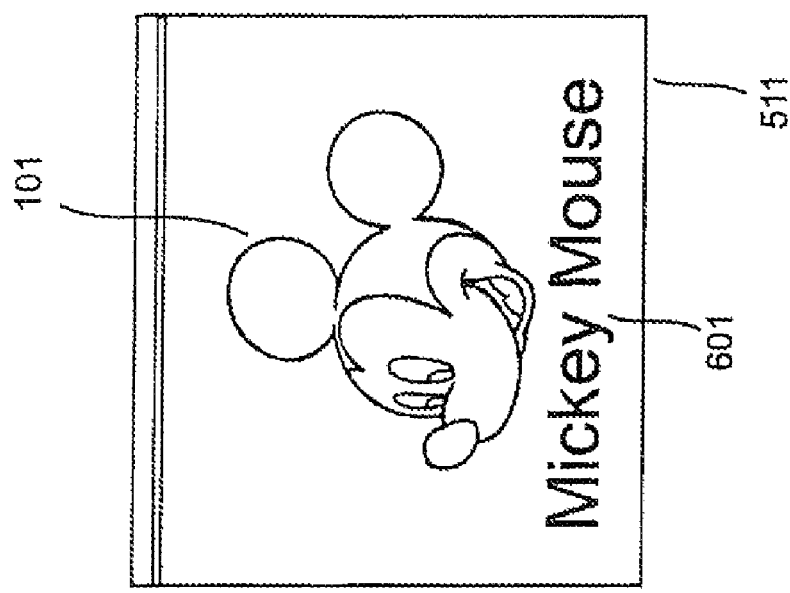
FIG. 6B is a back view of the embodiment of FIG. 6A comprising a second graphical image on a second side of the apparatus that has a different meaning than the first graphical image.

FIG. 6A is a front view of an embodiment of the invention comprising a graphical image 101 on a first side 511 of the apparatus that has a different meaning when viewed from each side of the apparatus. For example, a Mickey Mouse® image indicated at 101 on one side 511, as depicted in FIG. 6A may be viewed as a water molecule image 610 on the other side 512 of the bag as depicted in FIG. 6B. The shape may be exactly reflected or approximate in size and shape when viewed from each side of the bag. In one embodiment, the complete graphical image formed from the first graphical image and the second graphical image comprises a third image when viewed from the first side, and forms a fourth image when viewed from the second side. Alternatively, completely separate shapes and sizes may exist on each side of the bag. Another example may comprise a graphic image comprising a football that may be viewed as a pair of lips from a second side of the bag.

FIG. 7A is a front view of an embodiment of the invention comprising a graphical image 701 comprising a question on a first side 511. As depicted in FIG. 7B, a second side 512 of the apparatus comprises a graphical image in the form of an answer 702. The graphical images on each side of the bag are not required to comprise the same shape. For example, a question may be stated on one side of a bag such as "3+4=7", while on the other side of the bag, the answer "7" may be presented so that it is only visible from the second side of the bag, e.g., so that the answer is not visible to the viewer of the first side of the bag. Any complexity of question and answer may be utilized.

Figure 8B:
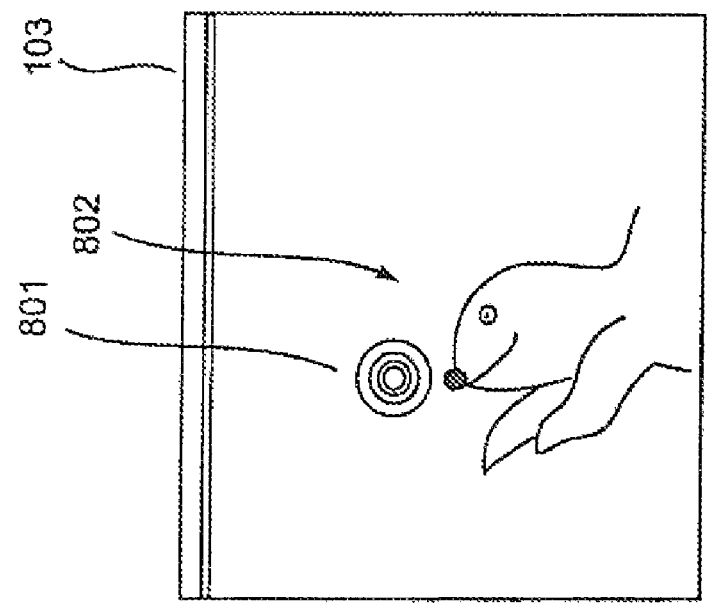
FIG. 8B is an alternative embodiment of FIG. 8A comprising a graphical image with an integrated marketing logo.
Figure 8A:
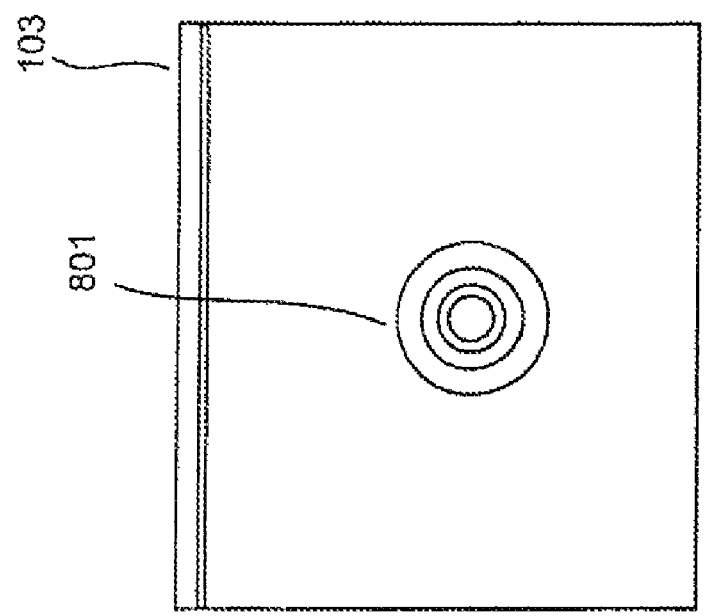
FIG. 8A is a front view of an embodiment of the invention comprising a graphical image comprising a marketing logo.

FIG. 8A is a front view of an embodiment of the invention comprising a graphical image 801 comprising a marketing logo. The graphical images may comprise marketing logos, either subtly integrated logo 802 as depicted in FIG. 8B, or prominently positioned logo 801, (or both).

Figure 9:
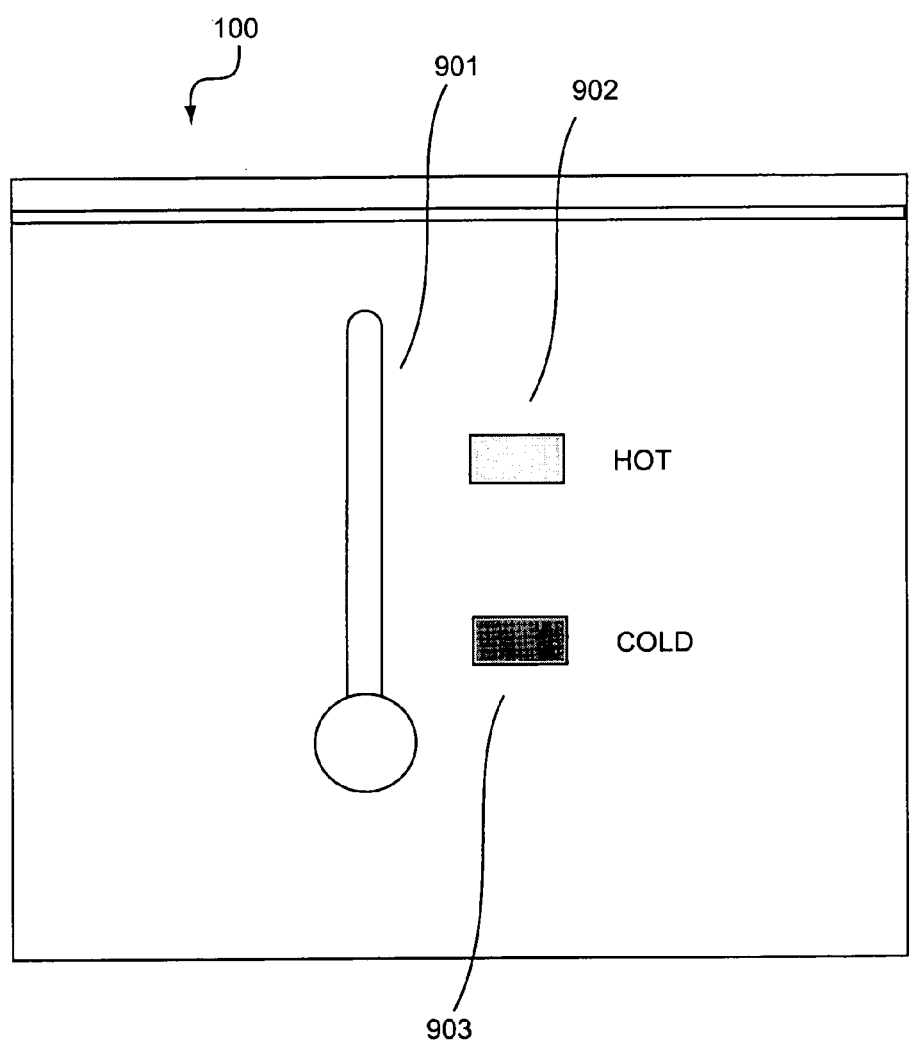
FIG. 9 is a front view of an embodiment of the invention comprising a graphical image comprising materials that change color based on their temperature.

FIG. 9 is a front view of an embodiment of the invention comprising a graphical image comprising materials that change color based on their temperature. Polymers comprising temperature dependent color compounds may be coupled with embodiments of the invention to allow for the presentation of information in color that changes based on temperature. This functionality allows for thermometer graphic 901 for example to visually display the temperature of the bag. Other indicium, such as hot gauge color indicator 902 and cold gauge color indicator 903 which represent the temperature for a given color may be presented in colors that are independent of temperature for example to provide a scale to use in judging the temperature dependent color for example. Alternatively, the entire bag may be coated or construction from a materials that change color based on temperature in order to show the relative temperature of the items inside the bag.

Figure 10:
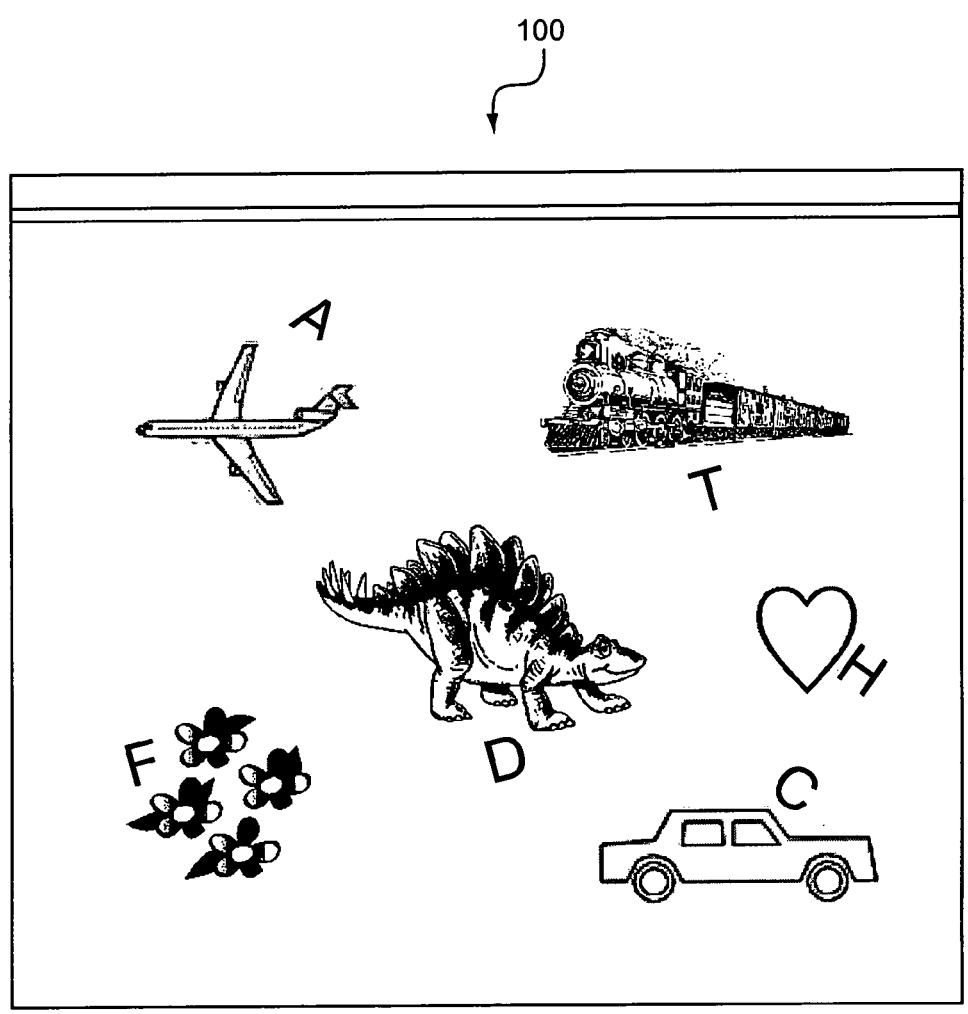
FIG. 10 is a front view of an embodiment of the invention comprising various graphical images and optional associated letters.

FIG. 10 is a front view of an embodiment of the invention comprising various graphical images and optional associated letters. Each graphical image may have an associated optional letter for teaching children the alphabet for example. The letters are optional and the dinosaur "D" may be shown without the letter in one or more embodiments of the invention. Optionally, the entire word, in any target language, may optionally be depicted in association with any graphical image. See, for example, FIGS. 6A and 6B depicting the words MICKEY MOUSE indicated at 601 and the words $H_2O$=WATER indicated at 611. Other graphical images may comprise phrases such as religious, spiritual and/or encouraging, for example "A BETTER WORLD", "WHAT PEACE LOOKS LIKE", "HAPPINESS" and/or "YOUR HOME AND FAMILY". In addition, seasonal images, such as Christmas Trees, Flags, or any other seasonal, historical or holiday related graphical image may be displayed. Celebrity images may also be displayed. Graphical images with dotted outlines for example may be traced with a finger or marker so that children may gain eye hand coordination. Contests may be run that allow for winning graphical images to appear on bags.

Figure 11:
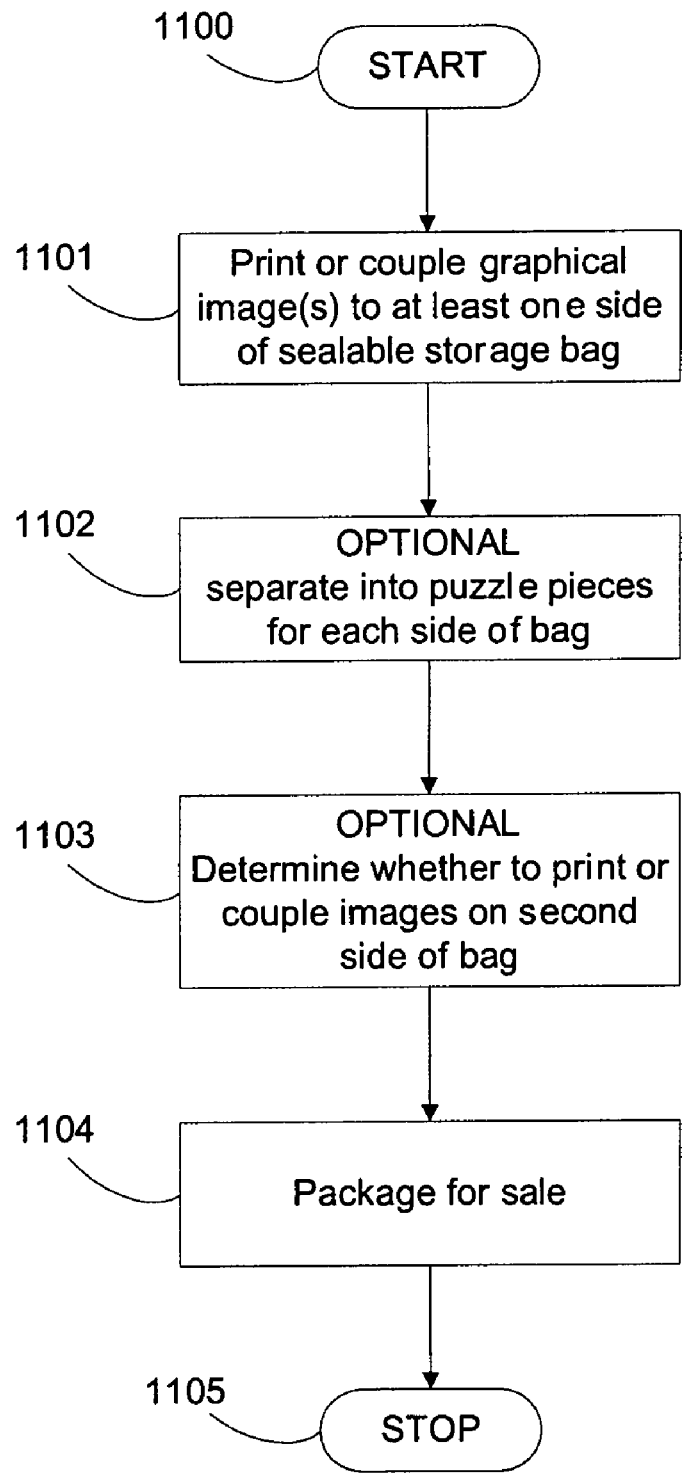
FIG. 11 shows a flowchart for presenting information on transparent resealable storage bags.

FIG. 11 shows a flowchart for presenting information on transparent resealable storage bags. Methods of presenting information utilizing the apparatus first start at 1100 then perform the steps of printing or coupling graphical images to one or both sides of the sealable storage bag, (either the inside or outside of each side) at 1101. Optionally, an image may be separated into puzzle pieces for separate printing of the first and second sides of the bag at 1102. A determination as to whether to print or couple images to both sides of a bag may be performed at 1103. The sealable storage bags are then generally packaged for sale at 1104 and the process ended at 1105. The information on the bags is thus presented to a viewer of the bag by the entity that has printed or coupled a graphical image to the bag.

As should be understood from the description above, the apparatus for presenting information on transparent resealable storage bags of the present invention may comprise: a transparent bag; said transparent bag comprising a resealable opening; said transparent bag further comprising a first side and a second side wherein said first side and said second side are coupled with said resealable opening and wherein said first side and said second side are coupled with one another where said first side and said second side are not coupled with said resealable opening; and, a first graphical image coupled with said first side and oriented to be viewable from said first side of said transparent bag.

Other features of the present invention may include:
  a second graphical image coupled with said second side oriented to be viewable from said second side of said transparent bag;
  a first graphical image configured to form a first image when viewed from said first side wherein said first graphical image is configured to form a second image differing from said first image when viewed from said second side of said transparent bag;
  a first graphical image coupled with said first side comprising a question and, a second graphical image coupled with said second side comprising an answer wherein said answer is not viewable from said first side;
  a second graphical image coupled with said second side and oriented to be viewable from said first side in conjunction with said first graphical image coupled with said first side;
  a first graphical image coupled with said first side oriented to be viewable from said second side in conjunction with said second graphical image coupled with said second side;
  a first graphical image coupled to said first side and said second graphical image coupled with said second side to form a complete graphical image when said first side and said second side are situated next to one another;
  wherein the complete graphical image comprises a first image when viewed from said first side and wherein said complete graphical image forms a second image when viewed from said second side;
  wherein said graphical image on said first side comprises an image formed from a material that changes color based on temperature; and
  wherein said first graphical image on said first side comprises a image that is selected from the group consisting of number, letter, cartoon character, color, animal, dinosaur, flower, train, car, plane, heart, marketing logo, puzzle, question, answer, thermometer, phrase, seasonal, historical, holiday or celebrity.

A method for presenting information on transparent resealable storage bags in accordance with the present invention comprises: obtaining a transparent storage bag comprising a first side, a second side and a resealable opening; coupling a graphical image on said first side of said transparent storage bag oriented to be viewable from said first side of said transparent bag; and, packaging at least one bag for sale.

Other steps of the present invention may include:

coupling a second graphical image on a second side oriented to be viewable from said second side of said transparent bag;

coupling a second graphical image with said second side of said transparent storage bag wherein said second graphical image is oriented to be viewable from said first side in conjunction with said first graphical image on said first side; and coupling said first graphical image on said first side wherein said first graphical image is oriented to be viewable from said second side in conjunction with said second graphical image on said second side.

Advantages of embodiments of the invention include making learning fun for kids, branding of logos (either subtly or explicitly), and turning a device that is normally devoid of information into a presentation apparatus that allows for the presentation of information in a setting where no possibility has ever existed, i.e., utilizing transparent resealable storage bags.

While the invention herein disclosed has been described by means of specific embodiments and applications thereof, numerous modifications and variations could be made thereto by those skilled in the art without departing from the scope of the invention set forth in the claims.

What is claimed is:

1. A resealable storage bag comprising:
a transparent first side;
a transparent second side coupled to the first side to define an interior storage space having a resealable opening;
a first graphical image coupled with said first side and oriented to be viewable from said first side of the storage bag; and
a second graphical image coupled with said second side oriented to be viewable from the first side of the storage bag, wherein said first and second graphical images combine to form a third graphical image viewable from the at least the first side of the storage bag when said first and second sides are situated next to one another, but which is obscured when said first and second sides are not situated next to one another such that the first and second graphical images constitute pieces of a puzzle, and wherein at least one of the first and second graphical images is formed from a material that changes color based on temperature.

2. The resealable storage bag of claim 1, wherein at least one of the first, second and third graphic images constitutes a thermometer.

3. The resealable storage bag of claim 1, wherein said first graphical image comprises an image that is selected from the group consisting of numbers, letters, cartoon characters, colors, animals, dinosaurs, flowers, trains, cars, planes, hearts, marketing logos, puzzles, questions, answers, phrases, seasonal images, historical images, holiday images and celebrities.

4. A resealable storage bag comprising:
a transparent first side;
a transparent second side coupled to the first side to define an interior storage space having a resealable opening;
a first graphical image coupled with said first side and oriented to be viewable only from said first side; and
a second graphical image which is connected to the first graphical image but different from said first graphical image, and oriented to be viewable only from said second side, wherein the first graphical image comprises a question and the second graphical image comprises an answer.

5. The resealable storage bag of claim 4, wherein the first graphical image defines an outline of a third graphical image viewable from the second side of the transparent bag.

6. The resealable storage bag of claim 5, wherein the second graphical image defines an outline or shape of a fourth graphical image viewable from the first side of the transparent bag.

* * * * *